(12) United States Patent
Haines et al.

(10) Patent No.: US 7,406,547 B2
(45) Date of Patent: Jul. 29, 2008

(54) SEQUENTIAL VECTORED BUFFER MANAGEMENT

(75) Inventors: Jonathan W. Haines, Boulder, CO (US); Steven S. Williams, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1349 days.

(21) Appl. No.: 09/894,821

(22) Filed: Jun. 28, 2001

(65) Prior Publication Data

US 2002/0091895 A1 Jul. 11, 2002

Related U.S. Application Data

(60) Provisional application No. 60/224,176, filed on Aug. 9, 2000.

(51) Int. Cl.
*G06F 13/14* (2006.01)
(52) U.S. Cl. .......................... 710/52; 711/113
(58) Field of Classification Search ............ 710/36, 710/41, 52, 55; 711/111, 112, 113
See application file for complete search history.

(56) References Cited

U.S. PATENT DOCUMENTS

| | | | |
|---|---|---|---|
| 5,263,160 A | 11/1993 | Porter, Jr. et al. | 395/600 |
| 5,717,884 A | 2/1998 | Gzym et al. | 395/416 |
| 5,878,280 A * | 3/1999 | Lucht | 710/52 |
| 5,893,162 A | 4/1999 | Lau et al. | 711/153 |
| 5,937,427 A * | 8/1999 | Shinagawa et al. | 711/113 |
| 5,978,893 A | 11/1999 | Bakshi et al. | 711/171 |
| 6,038,619 A * | 3/2000 | Berning et al. | 710/33 |
| 6,389,508 B1 * | 5/2002 | Tamura | 711/112 |
| 6,530,000 B1 * | 3/2003 | Krantz et al. | 711/151 |

* cited by examiner

*Primary Examiner*—Gary J Portka
(74) *Attorney, Agent, or Firm*—Westman, Champlin & Kelly, P.A.

(57) ABSTRACT

A method and apparatus for managing a buffer memory in a disc drive. An arbitrated buffer stores data read from, or to be written to, the disc. Sequential entries (that store pointers to the data) in the buffer, corresponding to a requested traversal, are traversed prior to voluntarily relinquishing ownership of the buffer.

19 Claims, 3 Drawing Sheets

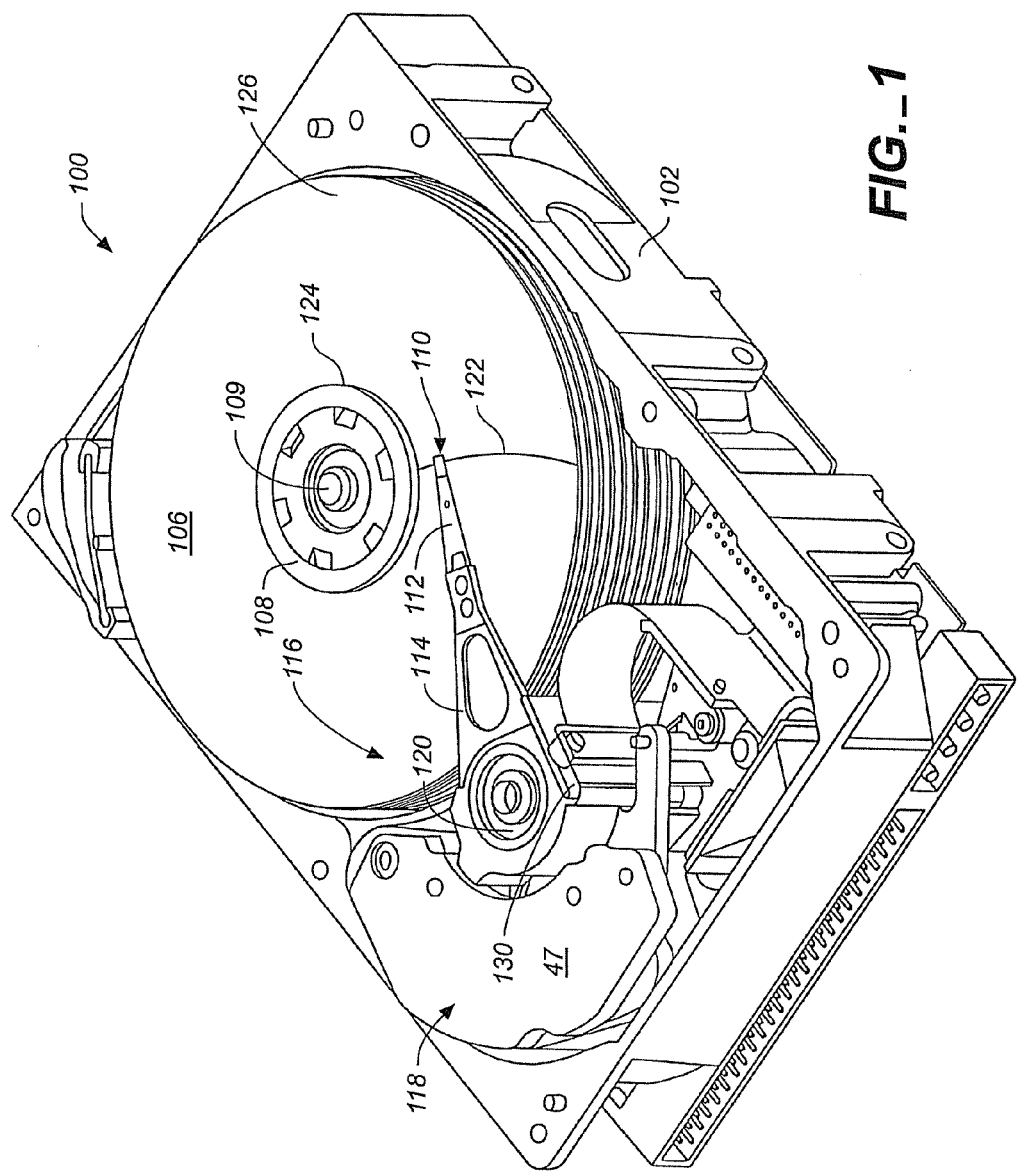
FIG._1

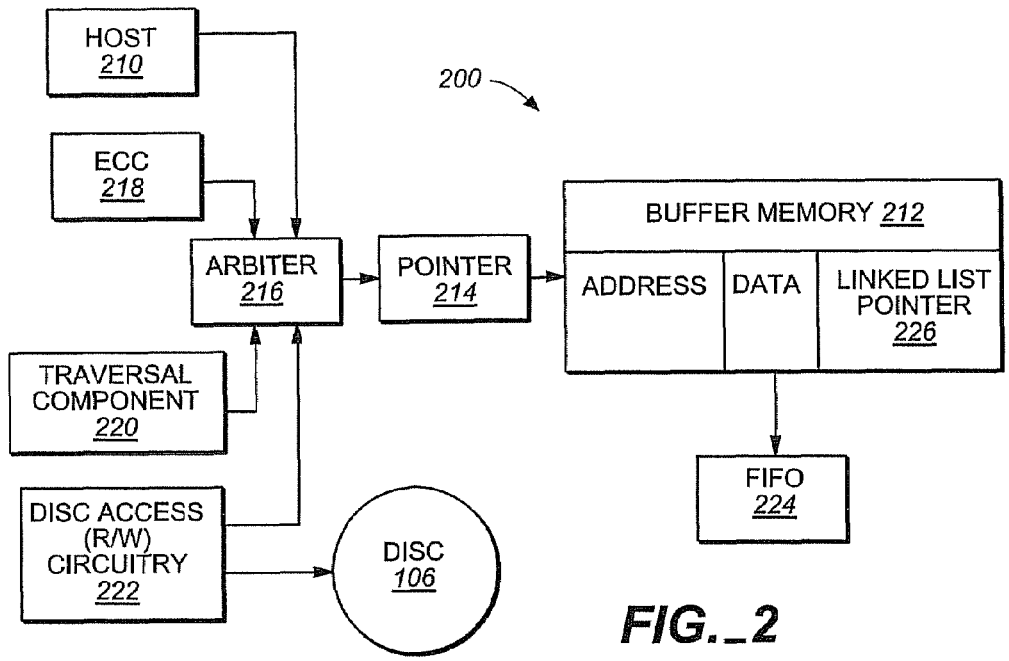
FIG._2
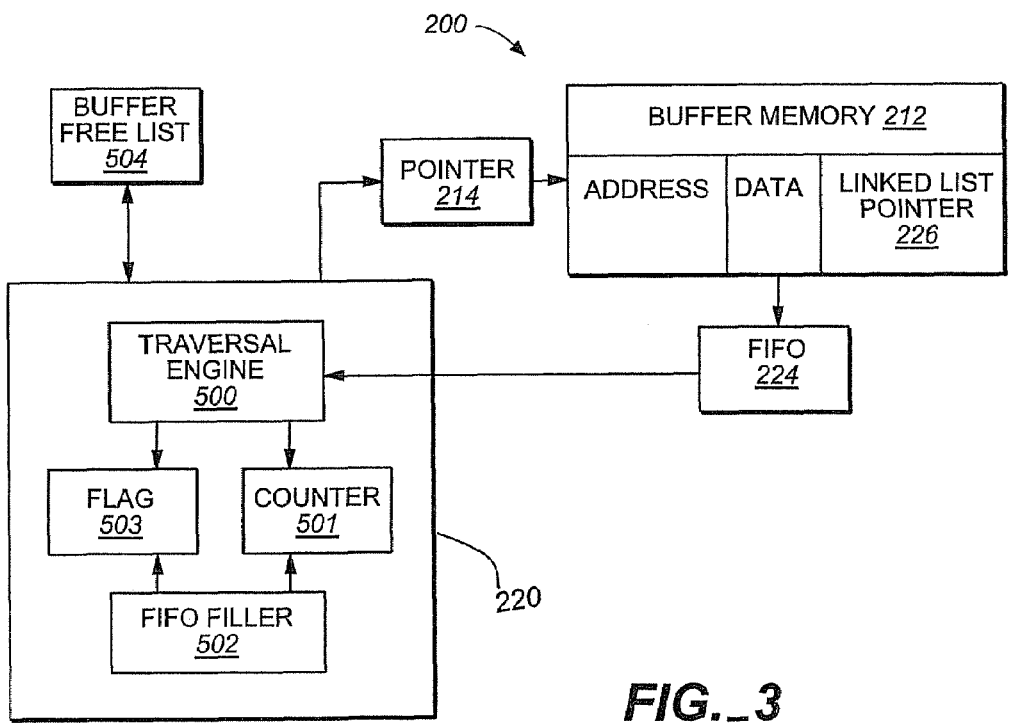
FIG._3

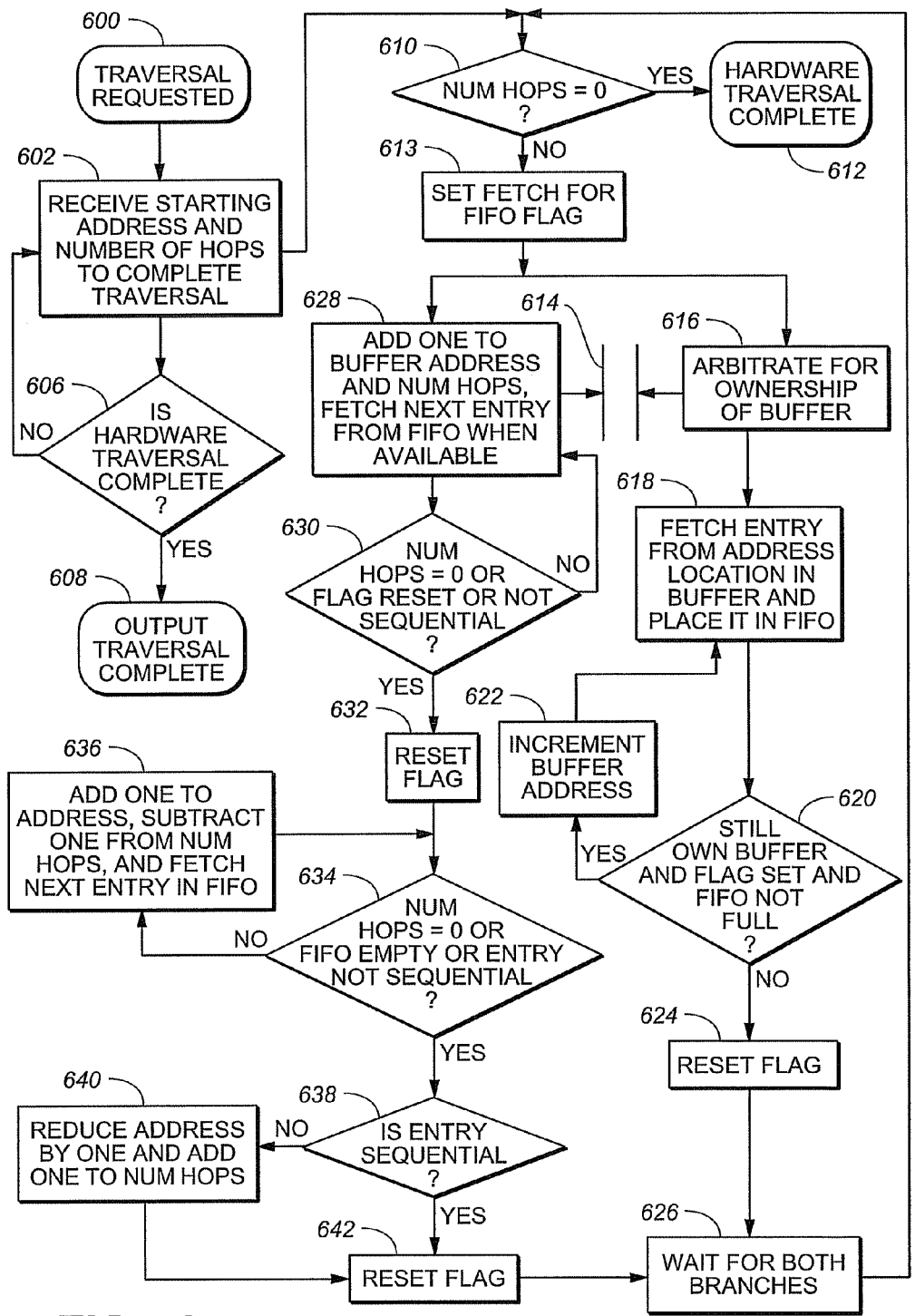
FIG._4

SEQUENTIAL VECTORED BUFFER MANAGEMENT

CROSS-REFERENCE TO RELATED APPLICATION

Reference is hereby made to, and priority is hereby claimed from U.S. provisional patent application Ser. No. 60/224,176 filed on Aug. 9, 2000, entitled Sequentially-Optimized Vectored Buffer Management.

FIELD OF THE INVENTION

The present invention relates to memory management. More specifically, the present invention relates to the management of buffer memory in a disc drive.

BACKGROUND OF THE INVENTION

Disc drives are typically used for information storage and utilize at least one rotatable disc with concentric tracks defined thereon for storing data. A data head (or transducer) is disposed relative to the disc surface to read data from, and write data to, the various tracks on the disc. The transducer is coupled to, or formed integrally with, an actuator arm which moves the transducer relative to the disc surface in order to access prespecified portions of the disc surface.

In retrieving data from, and writing data to, the discs, the disc drive often employs a cache or buffer memory. For instance, data to be written to the disc is often received from a host controller and written to the buffer or cache until the write circuitry has time to write the data from the buffer or cache to the specified location on the disc. Similarly, data retrieved from the disc is often written into the buffer until it can be retrieved by the host.

It often happens that the host, in writing data to the disc, will write data to a specified logical block address on the disc. That data is first written into cache were it is held until the write circuitry can write it to the actual specified location on the disc. However, prior to that data being written on the disc, the host may issue another write command, specifying different data to be written to the same logical block address on the disc. Vector buffer management techniques have thus been implemented to simply replace the older data in the buffer, or cache, with the new data to be written to the same logical block address. In this way, the write circuitry need only perform one write operation to the disc, rather than performing two separate write operations.

In any case, after performing a number of cache reads and cache writes, the cache or buffer can become highly fragmented. For example, the buffer or cache is typically accessed by a large number of different entities in the disc drive, such as the host, the disc control components (such as the reading and writing circuitry), error correction code (ECC) components, and a traversal engine which actually traverses a linked list in the buffer to determine where to access user (or host) data in the buffer. Some data in the buffer is stored as a single linked list such that the data corresponding to logical blocks (e.g., 512-byte chunks) on the disc are stored in buffer blocks (e.g., a two-byte values comprising a sector address) and are linked in the buffer by an address in one buffer block which points to the address of the next buffer block containing data in the specified logical block in the disc. Some data (such as host data) is stored in seemingly randomly located sectors of space in the buffer, which are located as indicated by the linked list.

In traversing the buffer, the traversal engine has traditionally functioned such that each access of a subsequent buffer or cache address was treated as a completely new and independent access to the cache. Therefore, even in situations where the traversal engine was to traverse three sequential buffer memory addresses, the traversal engine would release ownership of the buffer and re-arbitrate for access to each subsequent (or "next") buffer address location. This adds significant delay in the command overhead for the drive and degrades drive performance.

SUMMARY OF THE INVENTION

The present invention is implemented as a method or apparatus for managing a buffer memory in a disc drive. An arbitrated buffer stores data read from, or to be written to, the disc. All sequential entries in the buffer, corresponding to a requested traversal, are traversed prior to voluntarily relinquishing ownership of the buffer, until a higher priority requester asks for arbitration.

BRIEF DESCRIPTION OF THE DRAWINGS

FIG. 1 is an isometric view of a disc drive in accordance with one embodiment of the present invention.

FIG. 2 is a block diagram of a memory management system in accordance with one embodiment of the present invention.

FIG. 3 is a more detailed block diagram of a portion of a memory management system in accordance with one embodiment of the present invention.

FIG. 4 is a flow diagram illustrating one embodiment of the operation of the memory management system shown in FIG. 3.

DETAILED DESCRIPTION OF ILLUSTRATIVE EMBODIMENTS

FIG. 1 is an isometric view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated slider 110 which is mounted to disc drive 100 for communication with the disc surface. In the example shown in FIG. 1, sliders 110 are supported by suspensions 112 which are in turn attached to track accessing arms (or actuator arms) 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (shown as number 210 in FIG. 2).

FIG. 2 is a block diagram illustrating a memory management system 200 in accordance with one embodiment of the present invention. System 200 shows host 210, buffer 212, a buffer pointer 214, arbiter 216, error correction code (ECC) circuitry 218, traversal component 220, disc accessing circuitry (read/write circuitry) 222 and first in first out (FIFO), or "accessing," memory 224. In one embodiment, there can be separate memories 224 for different components (e.g., separate FIFOs for host accesses and disc accesses). As illustrated in FIG. 2, buffer memory 212 includes a data portion associated with each address in the buffer. The data portion has, attached thereto, a linked list pointer. Therefore, when data for logical blocks on disc 106 is to be written to disc 106, that data is provided by host 210, along with a logical block address for storage of the data on disc 106. The data is first written into buffer 212 at buffer address locations. Because the address locations may not be sequential, linked list pointer 226 points to the next address in buffer 212 which contains data corresponding to the next logical block address specified for the write operation. Therefore, when disc access circuitry 222 has finished its other read or write operations, it can access buffer 212 to obtain the data to be written to disc 106, retrieve that data, and write it to the designated logical block address on disc 106.

The same is true for read operations. For example, assume the specified logical block addresses 0-5 from disc 106 have been requested by host 210, have been read from disc 106 and have been stored in buffer 212 for access by host 210. The data from logical block addresses 0-5 may be stored at buffer memory addresses 0-3, 6 and 8, for instance. In that case, buffer memory address 0 would contain buffer memory address 1 in its linked list pointer section 226. This indicates that the data associated with that read operation continues at buffer memory address 1. Similarly, the data at buffer memory address 1 would include buffer memory address 2 in its linked list pointer portion 226. This indicates that, after the data at buffer memory address 1 has been accessed, the next portion of data corresponding to the data request resides in buffer memory address 2. This continues such that the data at buffer memory address 3 includes buffer memory address 6 in its linked list pointer 226. The data at buffer memory address 6 includes buffer memory address 8 in its linked list pointer 226. By simply following this linked list, the component accessing buffer memory 212 can obtain all of the memory associated with a given requested traversal for which it is accessing the buffer.

FIG. 2 also shows, however, that buffer 212 can be accessed by a wide variety of different components, including host 210, ECC component 218, disc access circuitry 222 and traversal component 220. In order to maintain orderly accessing of buffer 212, arbiter 216 is implemented which arbitrates ownership of the buffer pointer 214 (and hence access to buffer 212) among the various components which seek to access buffer 212.

Of the components illustrated in FIG. 2, the present discussion will proceed with greater detail with respect to traversal component 220. Traversal component 220 is illustratively a hardware component which actually traverses the buffer memory 212 in order to hop through the buffer accesses desired for a given traversal request.

In doing so, traversal component 220 is given, for example, a buffer memory starting address and a number of "hops" (or a number of additional memory addresses) which it must examine in order to satisfy the current buffer memory access operation (or requested traversal). Therefore, traversal component 220 arbitrates through arbiter 216 for ownership of the buffer memory pointer 214. Once it has successfully arbitrated ownership of pointer 214, traversal component 220 sets pointer 214 to the buffer memory starting address which it has been provided. Traversal component 220 can then access the data stored at the pointed-to address and follow the linked list pointer the predetermined number of "hops." The data contained at each buffer memory address is provided to FIFO 224 where it can be accessed by the portion of the disc drive which requires it. Again, it should be mentioned that more than one FIFO can be used.

In the past, traversal component 220 has been required to arbitrate for ownership of pointer 214 each time it desires to access a new buffer memory address. Therefore, even if, as in the example illustrated above, the requested traversal has a plurality of hops which are sequential in buffer 212, and can be performed very quickly, traversal component 220 has been required to de-arbitrate itself from ownership of pointer 214, re-initiate the arbitration process and arbitrate for ownership 214, only to access the very next sequential buffer memory address location in buffer 212. Thus, even in instances where memory mapping in buffer 212 has been sequential, traversing buffer 212 has taken an undesirably large amount of time. However, in accordance with the present invention, traversal component 220 is now configured to take advantage of sequential memory mapping in buffer 212, even where buffer 212 is not managed in a sequential fashion, but just happens to be storing data sequentially. This is illustrated in greater detail below.

FIG. 3 is a more detailed block diagram of one embodiment of the buffer management system shown in FIG. 2. FIG. 3 assumes that traversal component 220 currently has ownership of pointer 214. Therefore, arbiter 216 has been omitted, for the sake of clarity. FIG. 3 also shows that traversal component 220 illustratively includes traversal engine 500, counter 501, flag 503, and FIFO filler 502. FIG. 3 also shows that the memory management system can include a buffer free list 504. Buffer free list 504 illustratively includes a list of memory locations in buffer 212 which are currently free to be used. In one illustrative embodiment, buffer free list 504 not only includes hardware memory, but also includes a software component which encourages sequential buffer memory accesses when possible. When a segment of buffer 212 is freed, after being previously used, each contiguous sequential piece of the freed memory is compared to gaps in the current buffer free list to see if the newly freed buffer memory can be merged with any of the memory in the current buffer free list to obtain longer contiguous sequential free list segments. The buffer free list 504 illustratively includes a segment describer. Therefore, when a newly freed buffer segment can be merged with other segments in the buffer free list, the sequential free list segment describer is updated to reflect the change in buffering segmentation. In one illustrative embodiment, the piece of newly freed buffer is attached to a segment described by the free list segments describer.

However, implementation of the present invention does not depend, in any way, on positively managing buffer 212 in a sequential fashion. Instead, the present invention takes advantage of any sequential mapping in buffer 212, regardless of whether this is done on purpose.

While a description of the operation of traversal component 220 in accordance with the system shown in FIG. 3 is discussed in greater detail with respect to FIG. 4, it is discussed here briefly, merely as an overview.

When a traversal request is received by traversal component 220, along with the buffer memory 212 starting address, traversal component 220 is provided with a number of hops to take in order to completely traverse buffer 212 in accordance with the present request. The number of hops is loaded into counter 501. Upon successfully arbitrating ownership of pointer 214, FIFO filler 502 begins accessing buffer memory 212 address locations sequentially beginning at the starting buffer memory address location, and places the data from the accessed address in FIFO 224. Each time the data at a buffer memory address is accessed, the value in pointer 214 is incremented by 1. Also, FIFO filler 502 decrements the hops to traverse counter 501.

As FIFO 224 is being filled, traversal engine 500 accesses the information which has been loaded into FIFO 224. Traversal engine 500 looks to ensure that the entries in FIFO 224 actually correspond to sequential entries. By taking the example given above, where memory from logical block addresses 0-5 is requested and that data has been stored in buffer memory address location 0, 1, 2, 3, 6 and 8, the starting buffer memory address loaded into pointer 214 is buffer memory address 0. FIFO filler 502 thus begins at memory address 0 and accesses the data stored at that memory address and loads it into FIFO 224. Without regard to the linked list pointer 226 in buffer 212, FIFO filler 502 then increments pointer 214 by 1, accesses the data stored at that location and loads it into FIFO 224. Again, without regard to linked list pointer 226, FIFO filler 502 then again simply increments pointer 214 by 1 and accesses the data stored at that location in buffer 212.

At the same time, traversal engine 500 begins to examine the entries in FIFO 224. Traversal engine 500 looks at linked list pointer 226 and compares it to the next buffer memory address fetched from buffer 212 and stored in FIFO 224. Therefore, in the example given above, once traversal engine 500 has examined the entry from buffer memory address 3 in FIFO 224, it notes that the linked list pointer 226 is pointing to buffer memory address 6. Traversal engine 500 then looks at the next entry in FIFO 224 and determines that it was actually taken from buffer memory address 4 (since FIFO filler 502 proceeds in a sequential fashion, regardless of linked list pointer 226) and determines that such an entry is actually a non-sequential entry and then stops FIFO filler 502 from continuing to fill FIFO 224 with sequentially-fetched entries.

In any case, FIFO filler 502 fills FIFO 224 sequentially from buffer 212 while traversal engine 500 is examining the entries in FIFO 224 to ensure that they are actually sequential. In one illustrative embodiment, this continues until traversing is completed (e.g., the hops to go counter 501 is 0 and the FIFO pre-fetched entries are validated as being sequential) or until a higher priority requestor arbitrates ownership of the buffer. In another embodiment, FIFO filler 502 continues to fill FIFO 224 and engine 500 continues to validate those entries until the hops to traverse counter 501 is decremented to 0, until traversal engine 500 determines that an entry in FIFO 224 is actually a non-sequential entry, until FIFO 224 has been filled, or until another higher priority user successfully arbitrates ownership of pointer 214 away from traversal component 220.

It should also be noted that, after traversal engine 500 has considered an entry in FIFO 224, the data may be clocked out of FIFO 224 such that FIFO filler 502 can continue filling FIFO 224 in a circular fashion.

Once traversal component 220 has lost access to buffer 212 for any of the reasons stated above, and if traversal engine 500 has still not found a non-sequential entry in FIFO 224, traversal engine 500 can continue processing the information in FIFO 224 until it has processed all entries, or until it reaches a non-sequential entry.

It should also be noted that, because FIFO filler 502 is necessarily ahead of traversal engine 500, FIFO filler 502 may have placed additional entries in FIFO 224 after a non-sequential entry. In that instance, FIFO filler 502 will have erroneously decremented the hops to traverse counter 501 by the number of entries it has placed in FIFO 224, after the non-sequential entry. Therefore, assuming that there is some number N of false sequential entries (i.e., entries in FIFO 224 which were fetched by FIFO filler 502 assuming they were sequential, but they actually were not sequential or occurred after a non-sequential entry) traversal engine 500 decrements pointer 214 by the number N and also increments hops to traverse counter 501 by the number N. This resets the hops to traverse counter 501 and pointer 214 to the appropriate locations such that traversal of buffer 212 can again be commenced at the entry containing the first non-sequential linked list pointer.

If the hops to traverse counter 501 is still non-zero, traversal component 220 remains active and again arbitrates for ownership of pointer 214, at which point the process begins again. However, if the hops to traverse counter 501 is now 0, traversal component 220 has performed the requested traversal.

FIG. 4 is a more detailed discussion of the operation of the system illustrated in FIG. 3. FIGS. 3 and 4 shows that a requested traversal is first received from the drive controller, such as in response to a command from host 210, as indicated by block 600. In receiving the requested traversal, traversal component 220 is provided with the starting buffer memory address and the number of hops to take in buffer memory 212, as shown in block 602. The starting buffer memory address is loaded into pointer 214 and the number of hops is loaded into counter 501.

Next, a software module (although this may be done by a hardware component as well) is executed in parallel with hardware traversal of buffer memory 212. The software module simply keeps monitoring the hardware execution to determine whether the traversal is finished. This is indicated by block 606. Once the traversal has been completed, the software indicates this to the drive controller as indicated by block 608.

FIFO filler 502 then loads information from the starting buffer memory address into FIFO 224 and determines whether the number of hops to be taken is set to 0. This is indicated by block 610. If the number of hops is 0, then the traversal is complete as indicated by block 612. However, if the number hops is not 0, then FIFO filler 502 sets the fetch for FIFO flag 503. Flag 503 can be accessed by both traversal engine 500 and FIFO filler 502 and indicates to both components whether FIFO filler 502 is commencing its fetching operations into FIFO 224. Setting the flag 503 is indicated by block 613.

Once flag 503 is set, the operation of traversal engine 500 and FIFO filler 502 is performed in parallel. This is indicated by symbol 614. Therefore, FIFO filler 502 arbitrates for ownership of pointer 214. This is indicated by block 616. FIFO filler 502 then begins fetching entries from buffer 212 at the address location loaded into pointer 214. These entries are loaded into FIFO 224. This is indicated by block 618.

So long as traversal component 220 still owns pointer 214 and so long as flag 503 is still set, and further so long as FIFO 224 is not full, FIFO filler 502 simply continues to increment the buffer memory address in pointer 214, fetch the information located at that address location and load it into FIFO 224. This is indicated by blocks 620 and 622. When ownership of pointer 214 is lost, the FIFO is full, or traversal engine 220 has reset flag 503, if any of those things occur, FIFO filler 502 resets flag 503 (if it is not already cleared) as indicated by block 624. FIFO filler 502 then waits for traversal engine 500 to finish its traversal. This is indicated by block 626.

As discussed above, while FIFO filler 502 is filling FIFO 224 traversal engine 500 is examining the entries in FIFO 224 for sequentiality. In the embodiment illustrated in FIGS. 3 and 4, traversal engine 500 increments and decrements hops to traverse counter 501, rather than FIFO filler 502. In that case, traversal engine 500 moves to the next entry to be examined in FIFO 224, increases the buffer memory address count by 1 and decrements counter 501 by 1. This is indicated by block 628. In examining this entry in FIFO 224, the traversal engine determines whether the next entry in FIFO 224 is a sequential entry. In doing this, it compares the address in linked list pointer 226 of the entry under analysis in FIFO 224 to the current buffer memory address plus 1. If the two numbers are the equivalent, the next entry in FIFO 224 will be sequential. However, if they are not, then the present entry is the last sequential entry from FIFO 224 and traversal engine 500 resets flag 503 to stop FIFO filler 502 from continuing to fill FIFO 224 with sequential entries from buffer 212. This is indicated by blocks 630 and 632.

If, at block 630, it is determined that the next entry is a sequential entry, but that counter 501 has decremented to 0, traversal engine 500 resets flag 503 to stop FIFO filler 502 from continuing to fill FIFO filler 224. Further, if traversal engine 500 determines, at block 630 that FIFO filler 502 has reset flag 503, then processing continues on to block 632.

However, if at block 630 it is determined that the next entry is sequential, that FIFO filler 502 has not reset flag 503, and that counter 501 is non-zero, then processing continues at block 628 where traversal engine 500 examines the next entry in FIFO filler 224 for sequentiality.

At block 632, it is known that one of a number of things has happened. First, the counter 501 may have been decremented to 0 such that the traversal is complete. Also, however, traversal engine 500 may have encountered a non-sequential entry in FIFO 224. Similarly, flag 503 may simply have been reset by FIFO filler 502 either because it no longer owns pointer 214 or because the FIFO 224 is full. Depending on the precise reason why traversal engine 500 has been kicked out of the loop formed by blocks 628 and 630 it will take different actions. For example, if, at block 634 it is determined that counter 501 is still non-zero and that the FIFO 224 is not empty, and that the entries in FIFO 224, thus far, have been sequential, then traversal engine 500 continues to analyze the remaining entries in FIFO 224 for sequentiality. This is indicated by block 636. In doing this, traversal engine 500 increases its buffer memory address counter and reduces the count in counter 501 with each fetch from FIFO 224. This continues until either counter 501 is 0, FIFO 224 is empty, or a non-sequential entry is located in FIFO 224.

If at block 638 it is determined that a non-sequential entry in FIFO 224 has been encountered, then traversal engine 500 reduces the buffer memory address by 1 and increases the number of hops to traverse by 1. This is indicated by block 640. This is because those numbers will have been erroneously adjusted based on the assumption that the next entry in FIFO 224 is sequential, when in fact it was not. However, if processing reaches block 638 either because counter 501 has reached 0 or the FIFO 224 is empty, FIFO 224 is simply cleared as indicated in block 642, and processing continues at block 626. At block 626, traversal component 220 can be in one of a number of different states. For example, the hops to traverse counter 501 may be 0 indicating that the traverse has been completed. This case is determined at blocks 610 and 612. If processing has reached block 626 for any other reason, then the requested traversal is still not complete, but must continue. Therefore, processing continues at block 613 where flag 503 is set, FIFO filler 502 arbitrates for pointer 214 and traversal engine 500 begins examining the entries in FIFO 224.

It can thus be seen that the present invention provides significant advantages over prior art systems. For example, the present invention quickly and efficiently takes advantage of sequential entries in buffer 212, without requiring re-arbitration for ownership of the buffer in order to access each subsequent memory location. This significantly reduces the command overhead associated with the drive and thus increases drive performance.

One embodiment of the present invention includes a memory management system 200 in a disc drive 100 having at least one data storage disc 106. The memory management system includes an arbitrated buffer memory 212 having a plurality of memory address locations storing data associated with logical block addresses on the disc 106. The system 200 also includes a traversal component 220 configured to receive a requested traversal, arbitrate ownership of the buffer memory 212 to traverse sequentially mapped entries in the buffer 212 associated with the requested traversal prior to de-arbitrating itself from ownership of the buffer memory 212.

The traversal component 220 can illustratively include a memory accessing component 502 sequentially accessing entries in the buffer memory 212 based on the requested traversal and storing the entries in an accessing memory 224. The traversal component 220 can also include a traversal engine 500 configured to access the entries in the accessing memory 224 and determine whether the entries in the accessing memory 224 correspond to buffer memory entries corresponding to the requested traversal.

In one embodiment, the buffer memory 212 comprises a linked list of memory locations. The requested traversal includes a buffer memory starting address and a number of hops to take through the linked list beginning at the buffer memory starting address.

The traversal engine 500 can be configured to determine whether the entries in the accessing memory 224 correspond to buffer memory entries corresponding to the requested traversal by determining whether the entries in the accessing memory 224 correspond to buffer memory locations in the linked list identified by the requested traversal. The memory accessing component 502 and the traversal engine 500 are illustratively configured to operate substantially in parallel.

In one embodiment, the present invention is implemented as a method of managing a data buffer 212 in a disc drive 100. The method comprises steps of (a) receiving a traversal request to traverse the data buffer 212; (b) arbitrating for ownership of the data buffer 212; and (c) traversing all sequential entries in the data buffer 212, beginning at an entry point in the data buffer 212, corresponding to the traversal request prior to voluntarily relinquishing ownership of the data buffer 212.

The receiving step (a) can further include steps of (a)(1) receiving a data buffer starting address; and (a)(2) receiving a number of memory locations in the data buffer 212 which must be made to complete the traversal request. In one embodiment, the data buffer 212 comprises a linked list and the traversing step (c) comprises steps of (c)(1) reading sequential entries in the data buffer 212 into a register 224; and (c)(2) determining whether the entries in the register 224 correspond to the traversal request.

The traversing step (c) can further comprise performing the reading step (c)(1) and the determining step (c)(2) substantially in parallel. The traversing step (c) can also include a step of (c)(3) reducing the number of memory locations from step (a)(2) by one each time the determining step (c)(2) determines that an entry in the register 224 corresponds to the traversal request.

One embodiment of the method can further include a step of (d) voluntarily relinquishing ownership of the data buffer 212 after all sequential entries in the data buffer 212, corresponding to the traversal request, are read into the register 224. In addition, one embodiment of the method can include a step of (e) stopping the reading step (c)(1) when it is determined in step (c)(2) that an entry in the register 224 does not correspond to the traversal request; and (f) voluntarily relinquishing ownership of the data buffer 212. Also, in one embodiment, after ownership of the data buffer 212 has been relinquished, it is determined whether the number of memory locations from step (a)(2) has been reduced to zero. If it is determined that the number of memory locations from step (a)(2) has not been reduced to zero, ownership of the data buffer 212 is re-arbitrated.

Further, the method can include continuing the traversing step (c) until the number of memory locations to complete the traversal request is reduced to zero, by beginning traversing the data buffer 212 at an entry point at a next data buffer location in the linked list corresponding to the traversal request.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the drive while maintaining substantially the same functionality without departing from the scope and spirit of the present invention. In addition, although the preferred embodiment described herein is directed to a hard disc drive system, it will be appreciated by those skilled in the art that the teachings of the present invention can be applied to other systems, like optical or tape systems, without departing from the scope and spirit of the present invention.

What is claimed is:

1. A memory management system having at least one data storage medium, the memory management system comprising:
   - an arbitrated buffer memory having a plurality of memory address locations storing data associated with addresses of the data storage medium; and
   - a traversal component configured to receive a requested traversal, arbitrate ownership of the memory and to traverse sequentially mapped entries in the memory, associated with the requested traversal, prior to de-arbitrating itself from ownership of the memory.

2. The memory management system of claim 1 wherein the traversal component comprises:
   - a memory accessing component sequentially accessing entries in the memory based on the requested traversal and storing the entries in an accessing memory.

3. The memory management system of claim 2 wherein the traversal component comprises:
   - a traversal engine configured to access the entries in the accessing memory and determine whether the entries in the accessing memory correspond to memory entries corresponding to the requested traversal.

4. The memory management system of claim 3 wherein the memory comprises a linked list of memory locations.

5. The memory management system of claim 4 wherein the requested traversal includes a memory starting address and a number of hops to take through the linked list beginning at the memory starting address.

6. The memory management system of claim 5 wherein the traversal engine is configured to determine whether the entries in the accessing memory correspond to memory entries corresponding to the requested traversal by determining whether the entries in the accessing memory correspond to memory locations in the linked list identified by the requested traversal.

7. The memory management system of claim 6 wherein the memory accessing component and the traversal engine are configured to operate substantially in parallel.

8. The memory management system of claim 7 wherein the traversal component is configured to voluntarily relinquish ownership of the memory after traversing sequentially mapped entries in the memory and to re-arbitrate for ownership of the memory and continuing traversal of the memory until the requested traversal is complete.

9. A method of managing a data buffer, the method comprising:
   (a) receiving a traversal request to traverse the data buffer, wherein receiving operation (a) comprises:
      (a) (1) receiving a data buffer starting address; and
      (a) (2) receiving a number of memory locations in the data buffer which must be made to complete the traversal request;
   (b) arbitrating for ownership of the data buffer; and
   (c) traversing all sequential entries in the data buffer, beginning at an entry point in the data buffer, corresponding to the traversal request prior to voluntarily relinquishing ownership of the data buffer.

10. The method of claim 9 wherein the data buffer comprises a linked list and wherein the traversing operation (c) comprises:
   (c) (1) reading adjacent entries in the data buffer into a register; and
   (c) (2) determining whether the entries in the register correspond to the traversal request.

11. The method of claim 10 wherein the traversing operation (c) further comprises:
   performing the reading operation (c) (1) and the determining operation (c) (2) substantially in parallel.

12. The method of claim 11 wherein the traversing operation (c) further comprises:
   (c) (3) reducing the number of memory locations from the receiving operation (a) (2) by one each time the determining operation (c) (2) determines that an entry in the register corresponds to the traversal request.

13. The method of claim 12 and further comprising:
   (d) voluntarily relinquishing ownership of the data buffer after all sequential entries in the data buffer, corresponding to the traversal request, are read into the register.

14. The method of claim 12 and further comprising:
   (e) stopping the reading operation (c) (1) when it is determined in determining operation (c) (2) that an entry in the register does not correspond to the traversal request; and
   (f) voluntarily relinquishing ownership of the data buffer.

15. The method of claim 14 and further comprising:
   (g) after ownership of the data buffer has been relinquished, determining whether the number of memory locations from the receiving operation (a) (2) has been reduced to zero.

16. The method of claim 15 and further comprising:
   (h) if in step (g) it is determined that the number of memory locations from the receiving operation (a) (2) has not been reduced to zero, re-arbitrating for ownership of the data buffer.

17. The method of claim 16 and further comprising:

(i) continuing the traversing operation (c) until the number of memory locations to complete the traversal request is reduced to zero.

18. The method of claim 17 wherein the continuing operation (i) comprises:

(i)(1) beginning traversing the data buffer at an entry point at a next data buffer location in the linked list corresponding to the traversal request.

19. A data storage device, comprising:

a data storage medium; and means for buffering data written to and read from the data storage medium by utilizing sequentially mapped buffer data, associated with a requested traversal, to decrease time associated with buffering.

* * * * *